United States Patent [19]
Ohm

[11] Patent Number: 5,732,374
[45] Date of Patent: Mar. 24, 1998

[54] METHOD FOR JUDGING COLLISION WITH THREE DIRECTIONAL ACCELERATIVE SIGNALS AND APPARATUS FOR PERFORMING THE SAME

[75] Inventor: Jung-Woo Ohm, Seoul, Rep. of Korea

[73] Assignee: Daewoo Electronics Co., Ltd., Seoul, Rep. of Korea

[21] Appl. No.: 550,785

[22] Filed: Oct. 31, 1995

[30] Foreign Application Priority Data

Oct. 31, 1994 [KR] Rep. of Korea ............... 94-28162

[51] Int. Cl.$^6$ .................................................. B60R 21/32
[52] U.S. Cl. ........................................... 701/45; 280/735
[58] Field of Search ............................ 364/424.055, 566; 307/10.1; 280/728.1, 735; 180/268

[56] References Cited

U.S. PATENT DOCUMENTS

| | | | |
|---|---|---|---|
| 4,836,024 | 6/1989 | Woehrl et al. | 73/514 |
| 4,980,573 | 12/1990 | White et al. | 307/10.1 |
| 5,173,614 | 12/1992 | Woehrl et al. | 307/10.1 |
| 5,182,459 | 1/1993 | Okano et al. | 307/10.1 |
| 5,234,228 | 8/1993 | Morota et al. | 280/734 |
| 5,256,904 | 1/1993 | Tohbaru | 307/10.1 |
| 5,339,242 | 8/1994 | Reid et al. | 364/424.05 |
| 5,435,184 | 7/1995 | Pineroli et al. | 73/489 |
| 5,436,838 | 7/1995 | Miyamori | 364/424.05 |
| 5,441,300 | 8/1995 | Yokota et al. | 280/735 |
| 5,483,447 | 1/1996 | Jeenicke et al. | 364/424.05 |
| 5,521,822 | 5/1996 | Wang | 364/424.05 |
| 5,587,906 | 12/1996 | Melver et al. | 364/424.045 |
| 5,608,628 | 3/1997 | Drexler et al. | 364/424.055 |

FOREIGN PATENT DOCUMENTS

A2263571  7/1993  United Kingdom.

*Primary Examiner*—Michael Zanelli
*Attorney, Agent, or Firm*—Fish & Richardson P.C.

[57] ABSTRACT

An apparatus and method for judging an oblique, center pole and front barrier collision with the acceleration signals of a vehicle in back-and-forth, left-and-right and up-and-down directions are disclosed. The acceleration signal detected by an acceleration sensor is filtered and transferred to a collision judging part. The collision judging part judges a dangerous collision and generates a reset signal. The acceleration signal detected by the acceleration sensor is integrated. The judgement for an oblique, center pole and front barrier collision is achieved by comparing the integrated acceleration signal with each preset value. Both the low speed front barrier collision and the high speed center pole collision can be easily judged by detecting three directional accelerations of a vehicle and comparing those accelerations with the predetermined reference values.

9 Claims, 5 Drawing Sheets

METHOD FOR JUDGING COLLISION WITH THREE DIRECTIONAL ACCELERATIVE SIGNALS AND APPARATUS FOR PERFORMING THE SAME

BACKGROUND OF THE INVENTION

1. Field of the Invention

The present invention relates to a method for judging vehicle collision types of vehicles and apparatus for performing the same, and more particularly, to a method for judging with three directional (three axes) deceleration signals and to an apparatus for performing the same.

2. Prior Art

It is known that a collision judging apparatus or a collision type judging apparatus (hereinafter, referred to as a collision type judging apparatus), which is installed in a safety system of a vehicle, i.e., an air bag system or a safety-belt retracting system (hereinafter, referred to as an air bag system), drives an air bag system by sensing the collision of a vehicle.

When a vehicle collides with a non-moving obstacle, another vehicle or moving vehicle etc., passengers as well as the driver are injured. The air bag system, which protects passengers against such a case, prevents those from injury by unfolding the air bag immediately after the collision. Therefore, passengers can be protected only if the air bag system is immediately and responsively operated right after the collision of the vehicle by properly sensing the collision.

However, it is not desirable that the air bag should unfold on a light collision, because an unfolded air bag is not re-usable and should be replaced by a new one. On the other hand, if a collision that may give severe injury to passengers is not detected and the air bag system does not be operate, the passengers may suffer a fatal wound.

Accordingly, when the vehicle collides with something, it should be correctly judged to protect the passengers from being injured. For this purpose, the air bag system judges the collision of the vehicle by adopting a collision type judging system.

Vehicle collision types are classified into head-on collisions and lateral collisions. The head-on collisions, especially, are classified into a front barrier collision, an oblique collision and a center pole collision. The front barrier collision means that the whole front of the vehicle clashes against a barrier, the oblique collision means that the vehicle collides against an obstacle in an arbitrary angle, and the center pole collision is that a part of the front of the vehicle collides into a pole such as a telephone pole. On vehicle collision, the injuries sustained by the passengers depends on the collision types. Particularly, the center pole collision would give passengers a more severe injury than other types of collisions because a pole strikes the soft head portion of the vehicle and rushes for the engine.

Thus, air bag systems must decide in a very short time whether or not the air bag should be operated by considering the seriousness of the collision (i.e. the possibility of injury to the passengers) in cases of rapid deceleration like vehicle collisions. Further, a collision type judging system should judge not only a genuine collision but the collision type. A collision judging circuit, as such a system, is disclosed in U.S. Pat. No. 5,256,904 (issued to Shigero Tohbaru), which decides collision types by using the inertial velocity and the acceleration velocity of a vehicle.

There are three types of acceleration signals which are generated on a vehicle collision. The first is an X-component acceleration signal that is a traveling-direction (front-and-rear) acceleration component of a vehicle, the second is a Y-component acceleration signal that is a lateral (left-and-right) acceleration component of the vehicle, and the last is a Z-component acceleration signal that is a vertical (up-and-down) acceleration component of the vehicle. A prior collision type judging system usually judges the occurrence of collision with an X-component signal and/or a Y-component acceleration signal. That is, when a vehicle collides against something, the collision type judging system detects the collision by using the level of a X-component and/or a Y-component acceleration signal of a vehicle, which is detected by an acceleration sensor. The prior system can detect the front barrier collision or the oblique collision relatively easily since the X-component acceleration signal and/or the Y-component acceleration signal of a vehicle is rapidly and strongly propagated into the acceleration sensor through a comparatively rigid part of the vehicle body.

However, in case of the center pole collision, the collision impact of a vehicle is not properly propagated into the acceleration sensor due to the presence of the soft part of the vehicle which has been stricken by the pole, and an initial acceleration signal, as a result, is weakly generated when compared to the acceleration signals generated in the case of a front barrier collision and an oblique collision. Consequently, the prior collision type judging system cannot detect a high speed center pole collision, and this defect may cause passengers to be seriously injured.

In order to solve this problem, a system for improving the propagation of the acceleration signal through a soft part of vehicle body by strengthening the soft part with a reinforcing element was also disclosed. Further, a system for initially sensing a collision of a vehicle by adding a sensor into a crush zone, has been suggested. These systems, however, cause to the vehicle body to remolded.

SUMMARY OF THE INVENTION

Therefore, it is a first object of the present invention to provide a collision type judging method for judging a front barrier collision, an oblique collision and a center pole collision using three directional (three axes) acceleration signals which are detected by an acceleration sensor on a vehicle crush (collision) without rebuilding the vehicle body or without any additional sensors.

It is a second object of the present invention to provide a collision type judging apparatus which is appropriate for performing above method.

In order to achieve the above first object of the present invention, there is provided a method for judging a vehicle collision, which comprises the steps of:

(S1) detecting accelerations in a back-and-forth, a left-and-right and an up-and-down directions viewed from a traveling vehicle to generate a first, a second and a third acceleration signals;

(S2) filtering the first, the second and the third acceleration signals to eliminate high frequency signals thereof;

(S3) comparing the first acceleration signal with a preset reference value to judge whether or not the vehicle collision is dangerous, and outputting a reset signal when judging as not dangerous;

(S4) generating a synchronous signal in response to the reset signal;

(S5) generating a first, a second and a third velocity signals by first orderly integrating the first, the second and the third acceleration signals that are generated at the second step (S2) with respect to time while being synchronized to the synchronous signal; and (S6) judging the vehicle collision type by comparing the first, the second and the third velocity signals with a first, a second and a third preset values, while being synchronized to the synchronous signal.

The step (S6) may be performed by (i) judging as an oblique collision when the second velocity signal is a lower level than the second preset value over a second time by comparing the level of the second velocity signal with that of the second preset value, while being synchronized to the synchronous signal; (ii) judging as a front barrier collision when the first velocity signal has a higher level than the first preset value over the first time by comparing the first velocity signal with the first preset value, the step (ii) being performed when the second velocity signal has a higher level than the second preset value over the second time; and (iii) on the precondition that the first velocity signal has a lower level than the first preset value over the first time, comparing the third velocity signal with the third preset value and judging as the center pole collision when the third velocity signal has a higher level than the third preset value over the third time, and judging as the front barrier collision when the third velocity signal has a lower level than the third preset value over the third time.

To achieve the above second object of the present invention, there is provided a apparatus for judging a vehicle collision type, which comprises:

an acceleration sensor for detecting accelerations in a back-and-forth, a left-and-right and an up-and-down directions viewed from a traveling vehicle to generate a first, a second and a third acceleration signals;

a low-pass filter for filtering the first, the second and the third acceleration signals from the acceleration sensor to eliminate high frequency components thereof;

a collision judging means for judging as dangerous when the first acceleration signal supplied from the low-pass filter, has a higher level than the preset reference value during a predetermined time, and judging as not dangerous, for outputting a reset signal when the first acceleration signal has a lower level than the preset reference value during the predetermined time;

a clock for generating a synchronous signal with responding to the reset signal, the clock being reset by the reset signal.;

an integrator for generating a first, a second and a third velocity signals by first orderly integrating the first, the second and the third acceleration signals supplied from the low-pass filter with respect to time, the integrator being synchronized to the synchronous signal; and a collision type judging means for receiving the first, the second and the third velocity signals, comparing the first, the second and the third velocity signals with a first, a second and a third preset values to judge whether the vehicle collision is an oblique collision, a front barrier collision or a center pole collision, the collision type judging means being synchronized to the synchronous signal.

The collision type judging part judges the collision type is as either an oblique collision, a center pole collision or a front barrier collision, by sequentially comparing the lateral velocity signal of the vehicle with the second predetermined value, the traveling-direction velocity signal of the vehicle with the first predetermined value, and the up-and-down velocity signal of the vehicle with the third predetermined value.

The oblique collision of a vehicle can be detected by using the left-and-right directional velocity signal of a vehicle and the second predetermined value. The center pole collision can be judged by comparing the left-and-right velocity signal of a vehicle and the second predetermined value, by comparing the traveling velocity signal of the vehicle with the first predetermined value, and by comparing the normal directional velocity signal of a vehicle with the third predetermined value. Accordingly, the front barrier collision corresponds to the case that the collision type is not judged as the center pole collision.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT

Hereinafter, the present invention will now be described in connection with the accompanying drawings.

Figure 1:
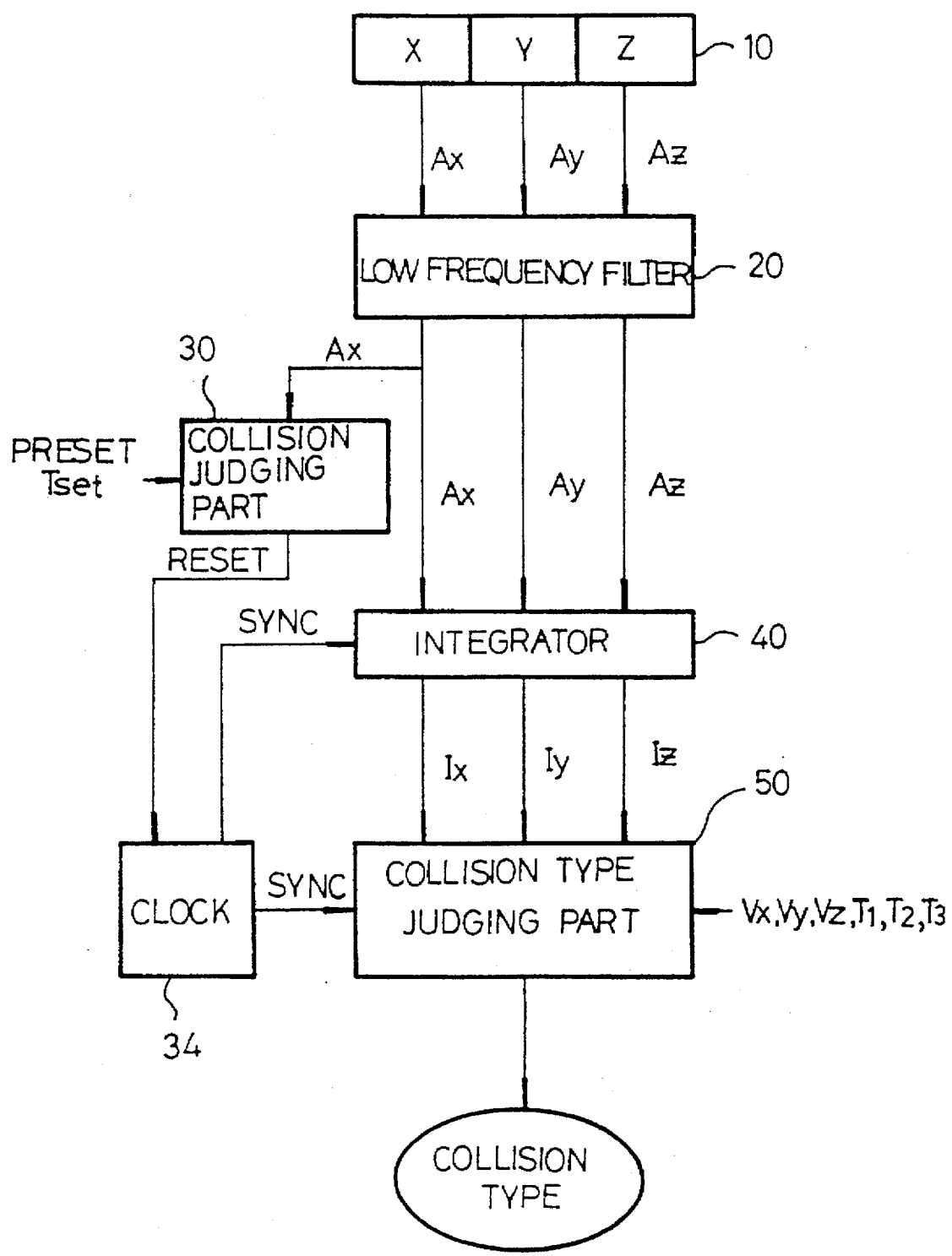
FIG. 1 is a block diagram for showing the configuration of the collision type judging apparatus according to a preferred embodiment of the present invention.

FIG. 1 is a block diagram for showing the configuration of a collision type judging apparatus 100 according to a preferred embodiment of the present invention.

An acceleration sensor 10 for sensing an accelerative velocity in a traveling direction (X-axis), a lateral direction (Y-axis) and a vertical direction (Z-axis) of a vehicle, detects the accelerative velocity of the vehicle, and then generates a first acceleration signal (Ax), a second acceleration signal (Ay) and a third acceleration signal (Az) which are a traveling acceleration component (X-axis), a lateral acceleration component (Y-axis) and a vertical acceleration component (Z-axis) of the vehicle respectively. The positive directions in the three directions are respectively the forward, left and upward directions viewed from the traveling vehicle.

The three directional acceleration signals which are generated from acceleration sensor 10, that is, the first, second and third acceleration signals (Ax, Ay and Az) include high frequency components such as noise and/or vibration, and thus such components should be removed. A low-pass filter 20 receives the first, second and third acceleration signals (Ax, Ay and Az) and filters the high frequency components such as noise and/or vibration.

A part of the first acceleration signal (Ax) filtered by low-pass filter 20 is transferred to a collision judging part 30.

Collision judging part 30 discriminates between a dangerous collision and a non-dangerous collision by comparing the first acceleration signal (Ax) with a preset value (PRESET) which was determined by experiment. When judged as a dangerous collision, collision judging part 30 produces a reset signal (RESET).

A clock 34 is initialized by the reset signal (RESET), and outputs a synchronous signal (SYNC).

An integrator 40 is synchronously driven by the synchronous signal (SYNC) generated by clock 34 just after the collision judging part 30 judges the collision as dangerous. After being triggered by the synchronous signal (SYNC), integrator 40 outputs a first, second and third velocity signals (Ix, Iy and Iz) by receiving the first, second and third acceleration signals (Ax, Ay and Az) filtered by low-pass filter 20 and then integrating these signals in the first order with respect to time.

The first velocity signal (Ix) shows the forward speed of the vehicle, which is the first orderly integrated value of the first acceleration signal (Ax).

Figure 3:
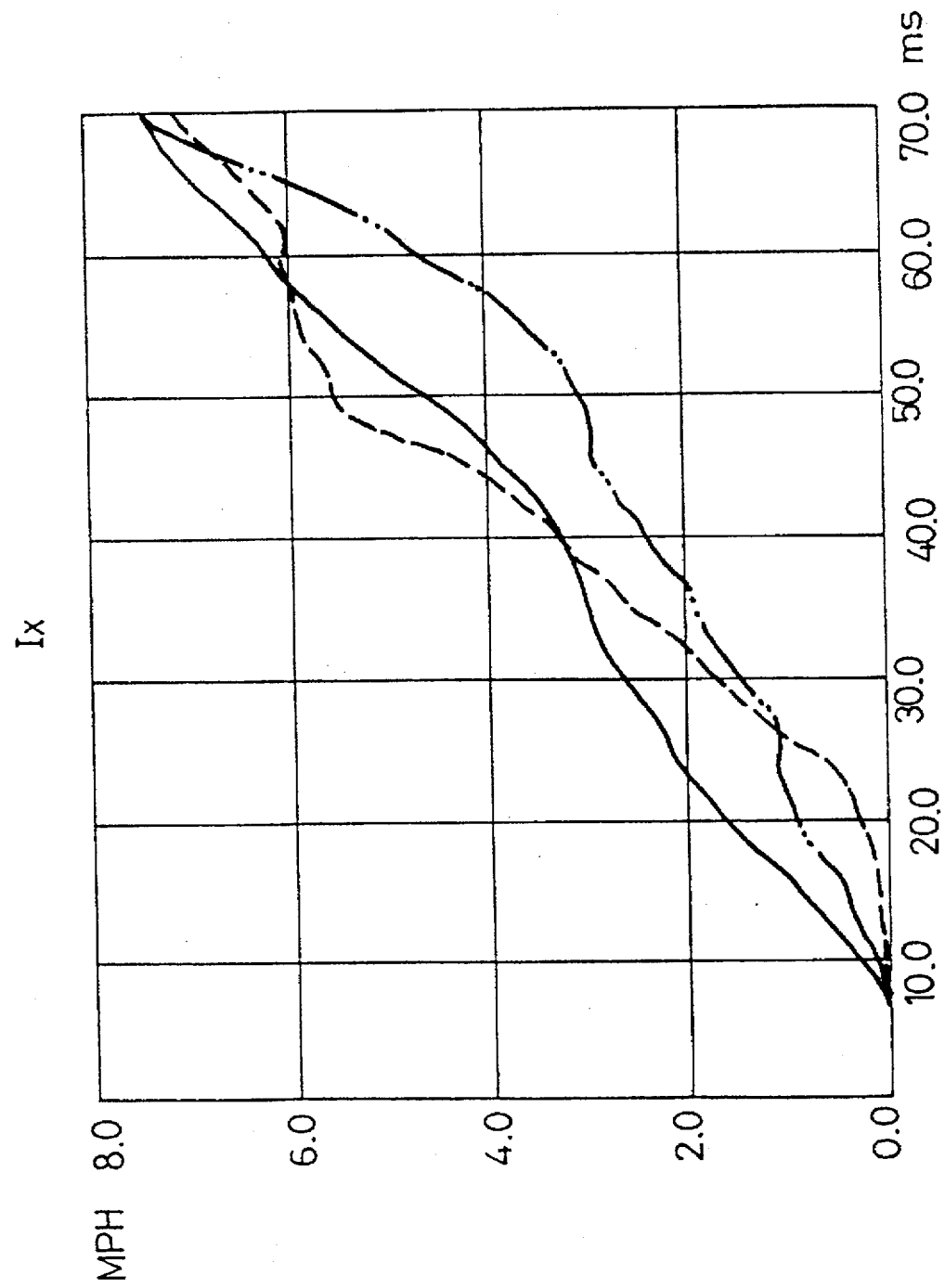
FIG. 3 is a graph for showing the traveling-direction velocity signals of a vehicle which have been obtained by integrating the acceleration signals which correspond to the types of back-and-forth collision of the vehicle.
Figure 4:
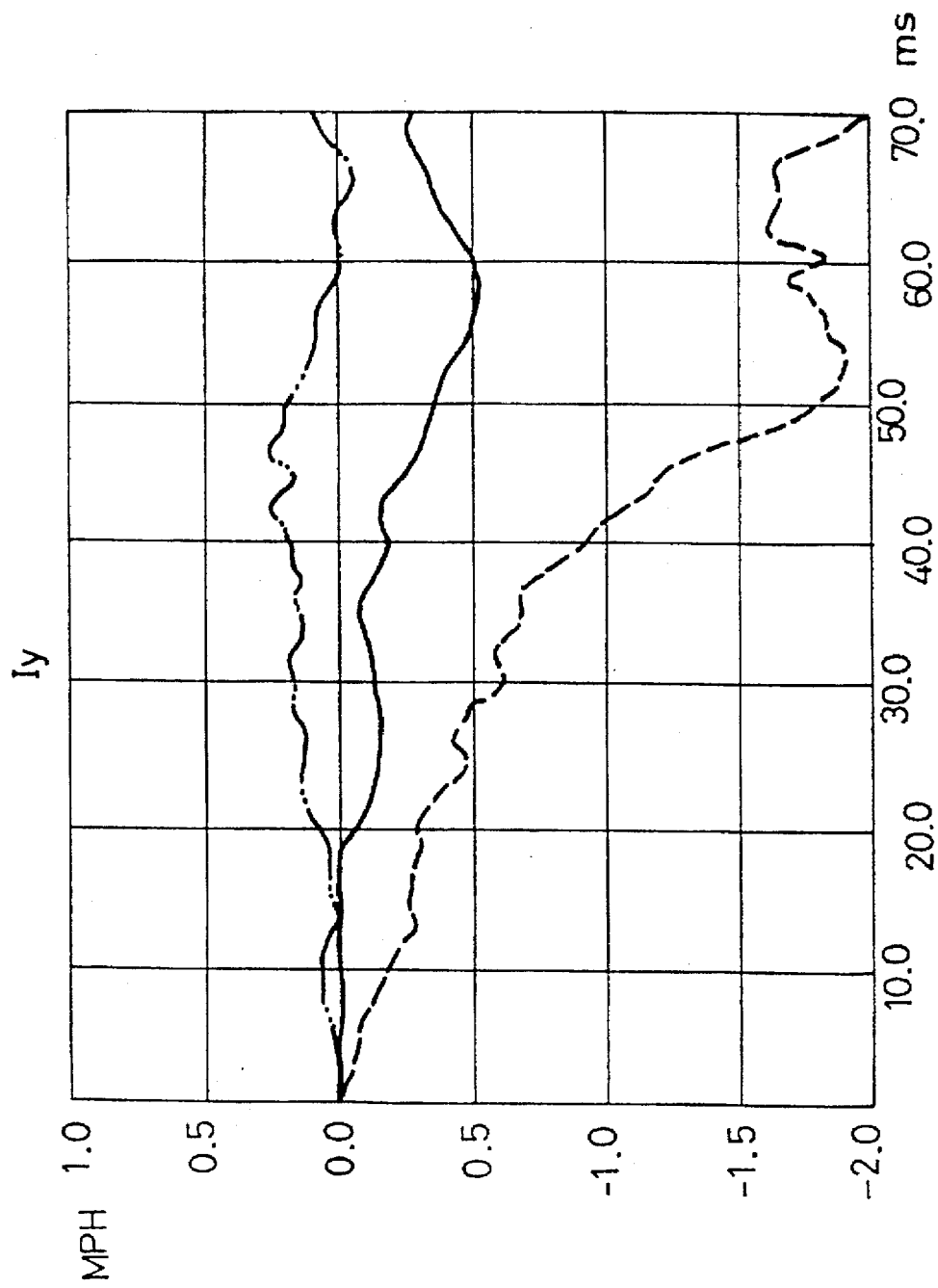
FIG. 4 is a graph for showing the left-and-right velocity signals of the vehicle which have been obtained by integrating the acceleration signals which correspond to the types of the lateral collision of the vehicle.
Figure 5:
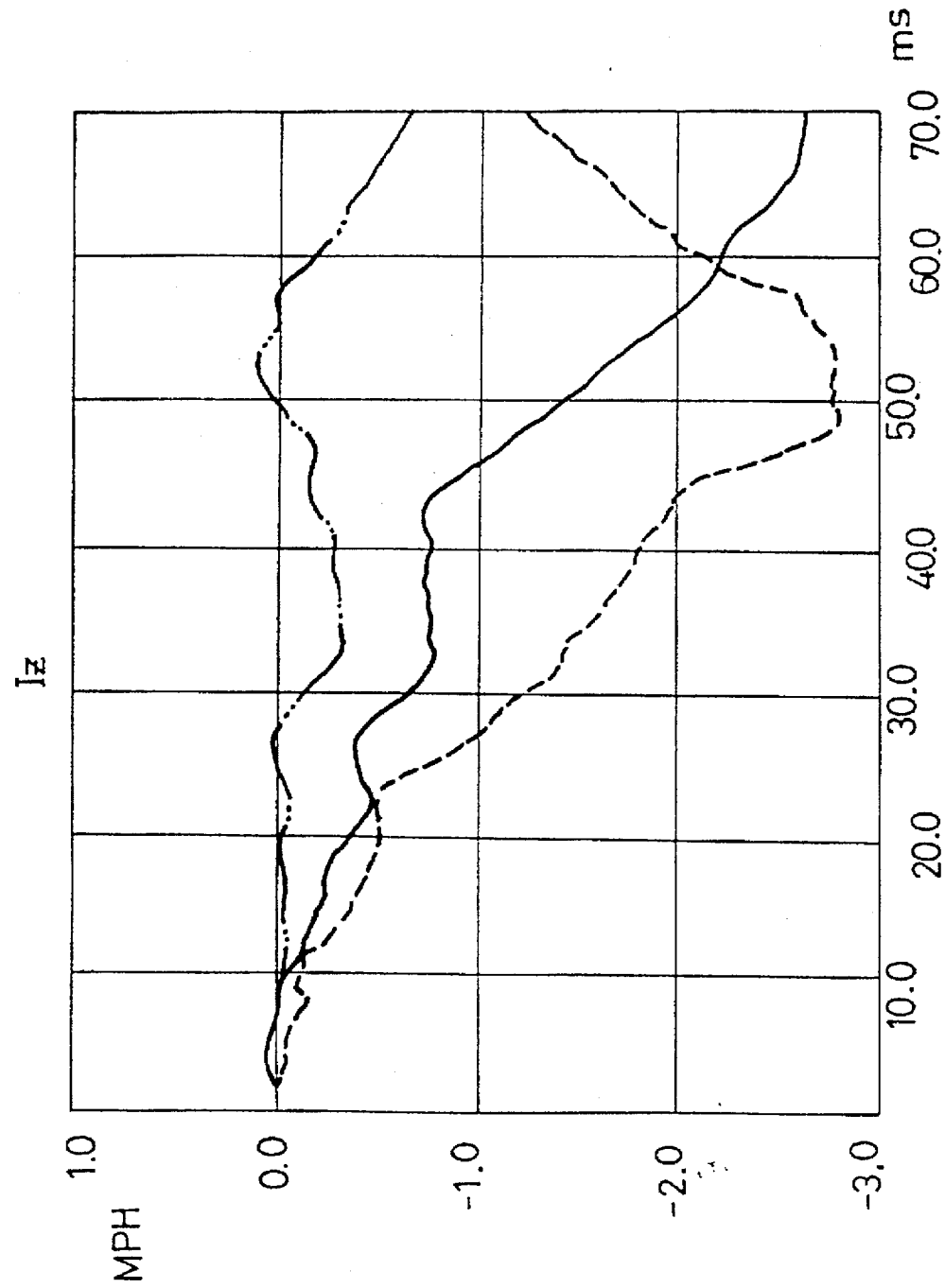
FIG. 5 is a graph for showing up-and-down velocity signals of the vehicle which have obtained by integrating the acceleration signals which correspond to the types of vertical collision of the vehicle.

This first velocity signal (Ix) is illustrated in FIG. 3, the second velocity signal (Iy) in FIG. 4, and the third velocity signal (Iz) in FIG. 5, respectively. In FIGS. 3, 4 and 5, the horizontal axis shows the time (mili-second) and the vertical axis show the velocity variation (miles per hour). The solid line shows the first order integrated value of an 8-mph front barrier collision, and the hidden line shows the first order integrated value of a 14-mph 30 degree oblique collision, and the two-dot chain line shows the first order integrated value of a 16-mph center pole collision.

A collision type judging part 50 is synchronized to the synchronous signal (SYNC) from clock 34, and judges the collision type by comparing the first, second and third velocity signals (Ix, Iy and Iz) which are outputted from integrator 40 with the first, second and third preset values, (Vx, Vy and Vz) which are the collision type reference values. Collision type judging part 50 sequentially judges the oblique, center pole and front barrier collision. The details are as follows.

FIG. 3 shows a graph for collision types of the first velocity signal (Ix). As shown in FIG. 3, the velocity signal (hidden line) on the 14-mph oblique collision and the velocity signal (two-dot chain line) on the 16-mph center pole collision is lower than the velocity signal (solid line) on the 8-mph front barrier collision. Here, the 8-mph front barrier collision is evaluated as a non-dangerous collision. Therefore, the first velocity signal (Ix) cannot judge the 14-mph oblique collision and the 16-mph center pole collision as more dangerous than the 8-mph front barrier collision.

FIG. 4 shows a graph for collision types of the second velocity signal (Iy). As shown in FIG. 4, the velocity signal (two-dot chain line) on the 16-mph center pole collision and the velocity signal (solid line) on the 8-mph front barrier collision are similar to each other in magnitude, and thus are difficult to discriminate one from the other. However, the velocity signal (hidden line) on the 14-mph oblique collision is lower than the velocity signal (solid line) on the 8-mph front barrier collision and thus are easy to discriminate one from the other. Therefore, the higher speed oblique collision which is more hazardous than the 8-mph front barrier collision can be judged with the left-and right directional second velocity signal (Iy) of an acceleration velocity.

In case of the center pole collision, as shown in FIG. 4, it is difficult to discriminate the center pole collision from the front barrier collision because the second velocity signal (Iy) has a small level difference compared to the 8-mph front barrier collision. Further, as shown in FIG. 3, the collision type cannot be judged by using the first order integrated value of the forward acceleration of the vehicle because the velocity signal (two-dot chain line) on the center pole collision is lower than that (solid line) of the front barrier collision.

Accordingly, in this case, the collision type should be judged with the third velocity signal (Iz) which is the first order integrated value of the up-and-down acceleration of a vehicle. As shown in FIG. 5, it is difficult to distinguish the velocity signal (hidden line) on the 14-mph oblique collision from the velocity signal (solid line) on the 8-mph front barrier collision. However, it is easy to discern the velocity signal (two-dot chain line) on 16-mph center pole collision from the velocity signal (solid line) on 8-mph front barrier collision. Thus, the center pole collision is judged by using the upward-and-downward velocity of a vehicle, that is, the third velocity signal (Iz) which is the first order integrated value of the up-and-down acceleration (Az) of the vehicle.

In such a step for distinguishing the oblique collision from the center pole collision, if it is not judged as an oblique or center pole collision, then the collision type is regarded as a front barrier collision.

Hereinafter, the explanation for the collision type judging process by using collision type judging apparatus 100 of the vehicle according to the preferred embodiment of the present invention will be given.

First, acceleration sensor 10 detects the acceleration of a vehicle, and then generates the first, second and third acceleration signals (Ax, Ay and Az).

The first, second and third acceleration signals (Ax, Ay and Az) generated from acceleration sensor 10 are transferred to low-pass filter 20, wherein the high frequency components such as noise and/or vibrations are filtered.

A part of the first acceleration signal (Ax) among the first, second and third acceleration signals (Ax, Ay and Az) filtered by low-pass filter 20 is transferred to collision judging part 30. Collision judging part 30 judges whether the collision is dangerous or not by comparing the preset reference value (PRESET) with the first acceleration signal (Ax). Collision judging part 30 judges the collision as dangerous if the level of the first acceleration signal (Ax) is higher than the reference value (PRESET) during all the predetermined time (Tset), or as not dangerous if not so. If it is judged as a dangerous collision, then collision judging part 30 outputs a reset signal (RESET). If it is judged as not-dangerous, collision judging part 30 continue to judge whether or not the collision occurs by receiving the first acceleration signal (Ax) which has been generated by acceleration sensor 10 and then has been outputted from low-pass filter 20.

The reset signal (RESET) generated in cases where the collision is judged as dangerous by collision judging part 30 is transferred to clock 34. The clock 34 outputs a synchronous signal (SYNC) by receiving the reset signal (RESET).

Integrator 40, which is synchronized to the synchronous signal (SYNC) from clock 34, generates the first, second and third velocity signals (Ix, Iy and Iz) by first orderly integrating the first, second and third acceleration signals (Ax, Ay and Az) from the low-pass filter 20, with respect to time.

Figure 2:
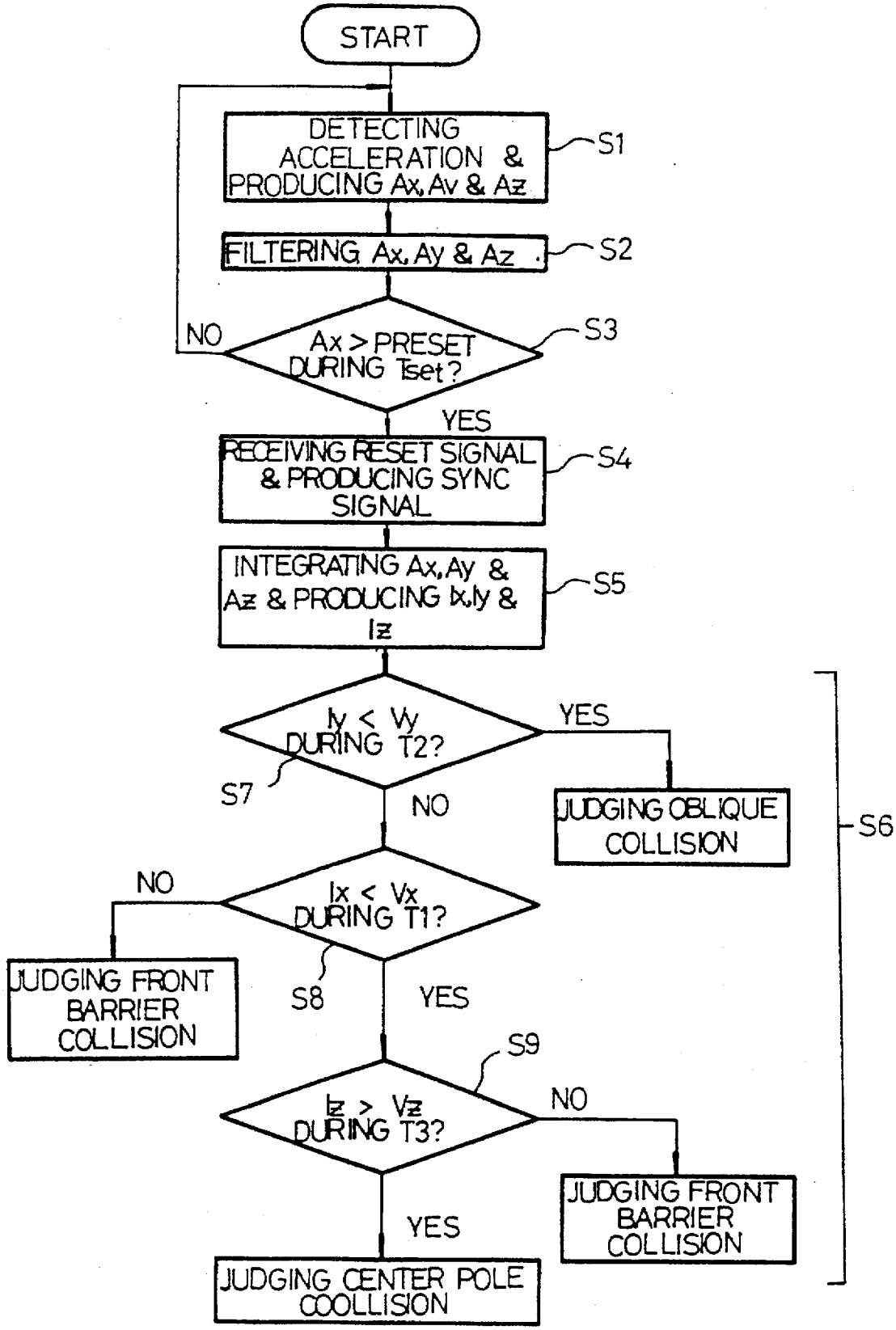
FIG. 2 is a flow chart for showing a collision type judging method of the collision type judging apparatus as shown in FIG. 1.

Collision type judging part 50 is synchronized to the synchronous signal (SYNC) from clock 34, as shown in FIG. 2, and judges the collision type by comparing the first, second and third velocity signals (Ix, Iy and Iz) received from integrator 40 with the first, second and third preset values (Vx, Vy and Vz).

Firstly, if the level of the second velocity signal (Iy) is kept below the second preset value (Vy) over the second time (T2), it is judged as an oblique collision by collision type judging part 50. When a collision is not judged as the oblique collision by using the second velocity signal (Iy), i.e., in the case that the level of the second velocity signal (Iy) is not kept under the second preset value (Vy) over the second time (T2), collision type judging part 50 observes whether the level of the first velocity signal (Ix) is lower than that of the first preset value (Vx) over the first time (T1).

If the first velocity signal (Ix) maintains lower level than the first preset value (Vx) over the first time (T1), collision type judging part 50 judges whether the third velocity signal (Vz) has higher level than the third preset value over the third time (T3). If the level of the first velocity signal (Ix) is lower than that of the first preset value (Vx) over the first time (T1) and if the level of the third velocity signal (Iz) is higher than that of the third preset value (Vz) over the third time (T3), collision type judging part 50 is lead to conclude it as a center pole collision.

However, when either the level of the second velocity signal (Iy) is not lower than that of the second preset value (Vy) over the second time (T2) and the level of the first velocity signal (Ix) is not lower than that of the first preset value (Vx) over the first time (T1), or when the level of the second velocity signal (Iy) is not lower than that of the second preset value (Vy) during over the second time (T2) and the level of the first velocity signal (Ix) is lower than that of the first preset value (Vx) over the first time (T1) and the level of the third velocity signal (Iz) is not higher than that of the third preset value (Vz) over the third time (T3), collision type judging part 50 judges it as a front barrier collision.

As illustrated in FIG. 2, collision type judging apparatus 100 according to the preferred embodiment of the present invention, which has the constitution and the operation as above, judges the vehicle collision type by the collision type judging method of the vehicle as follows.

The method for judging a vehicle collision type includes the acceleration signal detecting and producing step S1 in which acceleration sensor 10 detects the acceleration in the direction of back-and-forth, left-and-right and up-and-down (viewed from a traveling vehicle) and outputs the first acceleration signal (Ax), the second acceleration signal (Ay) and the third acceleration signal (Az) which correspond to the back-and-forth, left-and-right and up-and-down directions.

Then, at the filtering step S2, the first, second and third acceleration signals (Ax, Ay and Az) produced at the acceleration signal outputting step are filtered to eliminate high frequency components such as noise and/or vibrations.

The collision judging step S3 is served for judging whether or not the collision is dangerous by comparing a part of the first acceleration signal (Ax) taken from the first, second and third acceleration signal (Ax, Ay and Az) whose high frequency components are filtered with the preset reference value (PRESET). In the collision judging step S3, if the level of the first acceleration signal (Ax) is kept higher than the preset value (PRESET) over the predetermined time (Tset), it is judged as a dangerous collision. Otherwise, it is judged as a non-dangerous collision. If it is judged as a dangerous collision, the reset signal (RESET) is outputted. Otherwise, the acceleration signal detecting and producing step and the collision judging step are continually repeated.

The resetting step S4 is served for receiving the reset signal (RESET) produced at the collision judging step S3 and generates the synchronous signal (SYNC).

At the integrating step S5, the first, second and third acceleration signals (Ax, Ay and Az) obtained at the acceleration detecting and producing step S1 is integrated in time, which is performed synchronously to the synchronous signal (SYNC) supplied from the resetting step S4, to generates the first, the second and the third velocity signal (Ix, Iy and Iz).

The collision type judging step S6 is served for judging the collision type by comparing the first, second and third velocity signals (Ix, Iy and Iz) given at integrating step S5 with the first, second and third preset values (Vx, Vy and Vz), which is performed synchronously to the synchronous signal (SYNC) from the resetting step S4. The collision type judging step S6 comprises the first decision step S7, the second decision step S8 and the third decision step S9.

The first decision step S7 is served for comparing to find out whether the level of the second velocity signal (Iy) is kept below the second preset value (Vy) over the second time (T2).

The second decision step S8 is served for comparing to find out whether the level of the first velocity signal (Ix) is lower than that of the first preset value (Vx) over the first time (T1).

The third decision step S9 also is served for comparing to find out whether the level of the third velocity signal (Iz) is higher than that of the third preset value (Vz) over the third time(T3).

At the first decision step S7, if the second velocity signal (Iy) has a lower level than the second preset value (Vy) over the second time (T2), it is judged as the oblique collision. If the first velocity signal (Ix) continually has a higher level than the first preset value (Vx) over the first time (T1), it is judged as the front barrier collision. Finally, on the precondition that the first velocity signal (Ix) continually has a lower level than the first preset value (Vx) over the first time (T1) at the second decision step S8, when the third velocity signal (Iz) continually has higher level than the third preset value (Vz) over the third time (T3), it is determined as a center pole collision. Otherwise, it is judged as a front barrier collision.

As is apparent from the above disclosure, since the apparatus and method for judging the vehicle collision type of the present invention can correctly judge both the low speed front barrier collision and the high speed center pole collision by using the three directional acceleration signals, the air bag unfolding operation can be successfully controlled in accordance with the type of the vehicle collision type. In addition, as the high speed center pole collision can be properly detected in a very short time by using the system of the present invention, the protection level for passengers can be promoted in the event a high speed center pole collision should occur.

The collision type judging part, which is an element of the vehicle collision type judging apparatus according to the present invention using the three directional acceleration signals, can be well joined with various vehicle safety devices such as an air bag unfolding system, a safety belt retracting system and a vehicle driving recording system. Particularly, when applied to the driving recording system, it can be used as a black box.

Furthermore, there is no need to rebuild the vehicle or add a sensor for three directional accelerations since the apparatus of the present invention can afford to detect three directional accelerations of a vehicle by using one acceleration sensor, which leads to reducing cost.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of the patentable novelty that reside in the present invention, including all the features that would be treated as equivalents thereof by those skilled in the art to which this pertains.

What is claimed is:

1. A method for judging a vehicle collision, comprising the steps of:
   (S1) detecting accelerations in a back-and-forth, a left-and-right and an up-and-down directions viewed from a traveling vehicle to generate a first, second and a third acceleration signals respectively;
   (S2) filtering the first, the second and the third acceleration signals to minimize high frequency signals thereof;
   (S3) comparing the first acceleration signal with a preset reference value to judge whether or not the vehicle collision is dangerous, and outputting a reset signal when judging as dangerous;
   (S4) generating a synchronous signal in response to the reset signal;
   (S5) generating a first, a second and a third velocity signals by first orderly integrating the filtered first, the filtered second and the filtered third acceleration signals that are generated at the second step (S2) with respect to time while being synchronized to the synchronous signal; and
   (S6) judging the vehicle collision type by comparing the first, the second and the third velocity signals with first second and a third preset values, while being synchronized to the synchronous signal.

2. The method for judging a vehicle collision as claimed in claim 1, wherein in said step (S3) the vehicle collision is judged as dangerous when the first acceleration signal has a higher level than the preset reference value over a predetermined time, and judged as not dangerous when the first acceleration signal has a lower level than the preset reference value over the predetermined time.

3. The method for judging a vehicle collision in claim 1, wherein said step (S6) comprises the substeps of:
   (I) judging as an oblique collision when the second velocity signal is a lower level than the second preset value over a second time by comparing the level of the second velocity signal with that of the second preset value, while being synchronized to the synchronous signal;
   (Ii) judging as a front barrier collision when the first velocity signal has a higher level than the first preset value over a first time by comparing the first velocity signal with the first preset value, said step (ii) being performed when the second velocity signal has a higher level than the second preset value over the second time; and
   (Iii) on the precondition that the first velocity signal has a lower level than the first preset value over the first time, comparing the third velocity signal with the third preset value and judging as center a pole collision when the third velocity signal has a higher level than the third preset value over a third time, and judging as the front barrier collision when the third velocity signal has a lower level than the third preset value over the third time.

4. A method for judging a vehicle collision, comprising the steps of:
   (S1) detecting accelerations in back-and-forth, left-and-right and up-and-down directions viewed from a traveling vehicle to generate a first, a second and a third acceleration signals respectively;
   (S2) filtering the first, the second and the third acceleration signals to eliminate high frequency signals thereof;
   (S3) comparing the first acceleration signal with a preset reference value, judging as dangerous when the first acceleration signal has a higher level than the preset reference value over a predetermined time, and judging as not dangerous when the first acceleration signal has a lower level than the preset reference value over the predetermined time and outputting a reset signal when judging as dangerous;
   (S4) generating a synchronous signal in response to the reset signal;
   (S5) generating a first, a second and a third velocity signals by first orderly integrating the filtered first, the filtered second and the filtered third acceleration signals that are generated at the second step (S2) with respect to time while being synchronized to the synchronous signal; and
   (S6) judging the vehicle collision type, wherein the sixth step (S6) comprises the substeps of:
   (I) judging as an oblique collision when the second velocity signal is a lower level than a second preset value over a second time by comparing the level of the second velocity signal with that of the second preset value, while being synchronized to the synchronous signal;
   (Ii) judging as a front barrier collision when the first velocity signal has a higher level than the first preset value over a first time by comparing the first velocity signal with the first present value, said step (ii) being performed when the second velocity signal has a higher level than the second preset value over the second time; and
   (Iii) on the precondition that the first velocity signal has a lower level than the first preset value over the first time, comparing the third velocity signal with the third preset value and judging as a center pole collision when the third velocity signal has a higher level than the third preset value over a third time, and judging as the front barrier collision when the third velocity signal has a lower level than the third preset value over the third time.

5. A apparatus for judging a vehicle collision type, said apparatus comprising:
   an acceleration sensor for detecting accelerations in a back-and-forth, a left-and-right and an up-and-down directions viewed from a traveling vehicle to generate a first, a second and a third acceleration signals respectively;
   a low-pass filter for filtering the first, the second and the third acceleration signals from said acceleration sensor to eliminate high frequency components thereof;
   a collision judging means for judging as dangerous when the first acceleration signal supplied from the low-pass filter has a higher level than the preset reference value during a predetermined time, judging as not dangerous when the first acceleration signal has a lower level than the preset reference value during the predetermined time and for outputting a reset signal when judging as dangerous;
   a clock for generating a synchronous signal in response to the reset signal, said clock being reset by the reset signal;

an integrator for generating a first, a second and a third velocity signals by first orderly integrating the filtered first, the filtered second and the filtered third acceleration signals supplied from said low-pass filter with respect to time, said integrator being synchronized to the synchronous signal; and a collision type judging means for receiving the first, the second and the third velocity signals, comparing the first, the second and the third velocity signals with a first, a second and a third preset values to judge whether the vehicle collision is an oblique collision, a front barrier collision or a center pole collision, said collision type judging means synchronized to the synchronous signal.

6. The apparatus for judging a vehicle collision type as claimed in claim 5, wherein said collision judging means judges the vehicle collision as dangerous when the first acceleration signal has a higher level than the preset reference value over a predetermined time, and judges as not dangerous when the first acceleration signal has a lower level than the preset reference value over the predetermined time.

7. The apparatus for judging a vehicle collision type as claimed in claim 5 wherein said collision judging means judges the vehicle collision as an oblique collision when the second velocity signal has a lower level than the second preset value over a second time, judges as a front barrier collision when the second velocity signal has a higher level than the second preset value over a second time and when the first velocity signal has a higher level than the first preset value over a first time, and judges as a center pole collision when the third velocity signal has a higher level than the third preset value over a third time or as a front barrier collision when the third velocity signal has a lower level than the third preset value over the third time on the precondition that the second velocity signal has a higher level than the second preset value over the second time and the first velocity signal has higher level than the first preset over the first time.

8. A apparatus for judging a vehicle collision type, said apparatus comprising:

an acceleration sensor for detecting accelerations in a back-and-forth, a left-and-right and an up-and-down directions viewed from a traveling vehicle to generate a first, a second and a third acceleration signals respectively;

a low-pass filter for filtering the first, the second and the third acceleration signals from said acceleration sensor to eliminate high frequency components thereof;

a collision judging means for judging as dangerous when the first acceleration signal supplied from the low-pass filter has a higher level than a preset reference value during a predetermined time, and for outputting a reset signal, and judging as not dangerous when the first acceleration signal has a lower level than the preset reference value during the predetermined time;

a clock for generating a synchronous signal in response to the reset signal, said clock being reset by the reset signal;

an integrator for generating a first, a second and a third velocity signals by first orderly integrating the filtered first, the filtered second and the filtered third acceleration signals supplied from said low-pass filter with respect to time, said integrator being synchronized to the synchronous signal; and a collision type judging means for receiving the first, the second and the third velocity signals, for judging as an oblique collision when the second velocity signal as a lower level than a second preset value over a second time, judging as a front barrier collision when the second velocity signal has a higher level than the second preset value over the second time and when the first velocity signal has a higher level than a first preset value over a first time, and judging as a center pole collision when the third velocity signal has a higher level than a third preset value over a third time or as a front barrier collision when the third velocity signal has a lower level than the third preset value over the third time on the precondition that the second velocity signal has a higher level than the second preset value over the second time and the first velocity signal has higher level than the first preset value over the first time, said collision type judging means being synchronized to the synchronous signal.

9. A method for judging a vehicle collision, comprising the steps of:

(S1) detecting accelerations in a back-and-forth, a left-and-right and an up-and-down directions viewed from a traveling vehicle to generate a first, second and third acceleration signals respectively;

(S2) filtering the first, the second and third acceleration signals to minimize high frequency signals thereof;

(S3) comparing the first acceleration signal with a present reference value to judge whether or not the vehicle collision is dangerous, and outputting a reset signal when said vehicle collision is judged to be in a specified condition;

(S4) generating a synchronous signal in response to the reset signal;

(S5) generating a first, a second and a third velocity signals by first orderly integrating the filtered first, the filtered second and the filtered third acceleration signals that are generated in the second step (S2) with respect to time while being synchronized to the synchronous signal; and (S6) judging the vehicle collision type by comparing the first, the second and the third velocity signals with first, second and third preset values, while being synchronized to the synchronous signal.

* * * * *